United States Patent
Ball et al.

[11] Patent Number: 5,930,888
[45] Date of Patent: Aug. 3, 1999

[54] DEVICE TO HOLD, DISPENSE AND INSTALL SLOTTED WEIGHTS USED WITH FISHING LINE

[75] Inventors: Ralph C Ball, Buffalo, N.Y.; Mark E Lyons, Greenville, S.C.

[73] Assignees: Ralph C. Ball; Mark E. Lyons, both of Lackawanna, N.Y.

[21] Appl. No.: 08/845,756

[22] Filed: Apr. 25, 1997

Related U.S. Application Data

[63] Continuation-in-part of application No. 08/565,878, Dec. 1, 1995, abandoned.

[51] Int. Cl.[6] .................................................... B25B 27/14
[52] U.S. Cl. .................................................................. 29/817
[58] Field of Search ................................... 29/239, 283.5, 29/270, 426.5, 817; 72/409.04; 43/25, 25.2, 44.89

[56] References Cited

U.S. PATENT DOCUMENTS

| | | | |
|---|---|---|---|
| 2,603,992 | 7/1952 | Brown et al. | 29/817 X |
| 2,736,026 | 2/1956 | Belokin | 29/817 |
| 2,829,550 | 4/1958 | Mahshaw | 29/817 X |
| 2,842,993 | 7/1958 | Thomas | 72/409.04 |
| 2,844,980 | 7/1958 | Johnson | 72/409.04 X |
| 3,067,499 | 12/1962 | Shaw | 29/817 X |
| 3,583,202 | 6/1971 | Blakeway | 29/817 X |
| 3,914,975 | 10/1975 | Karr | 29/817 X |
| 4,377,027 | 3/1983 | Price | 29/817 X |

*Primary Examiner*—S. Thomas Hughes

[57] ABSTRACT

A simple device adaptable for the storage, dispensing and installation of split shot sinker on a fishing line. Two construction methods are disclosed allowing assembly from molded components or using commercially available tubular stock material. The unit, regardless of construction method, is capable of mechanically delivering one of the properly aligned sinkers to a dispensing position. From the dispensing position, subsequent manipulation closes the sinker on a fishing line. A single contact element allows insertion of sinkers into the unit, retention of the sinkers within the unit and provides for the application of a controlled pressure to close the slot of each sinker. Deployment of this single contact element may be singular or in opposing sets. Removal tools allow release of attached sinkers from fishing line for reuse within the unit for reattachment to a fishing line. Attachment of the unit to other fishing equipment is possible for ease of handling and ready accessibility. A version of the unit is capable of manipulation of sinkers having different weights.

18 Claims, 9 Drawing Sheets

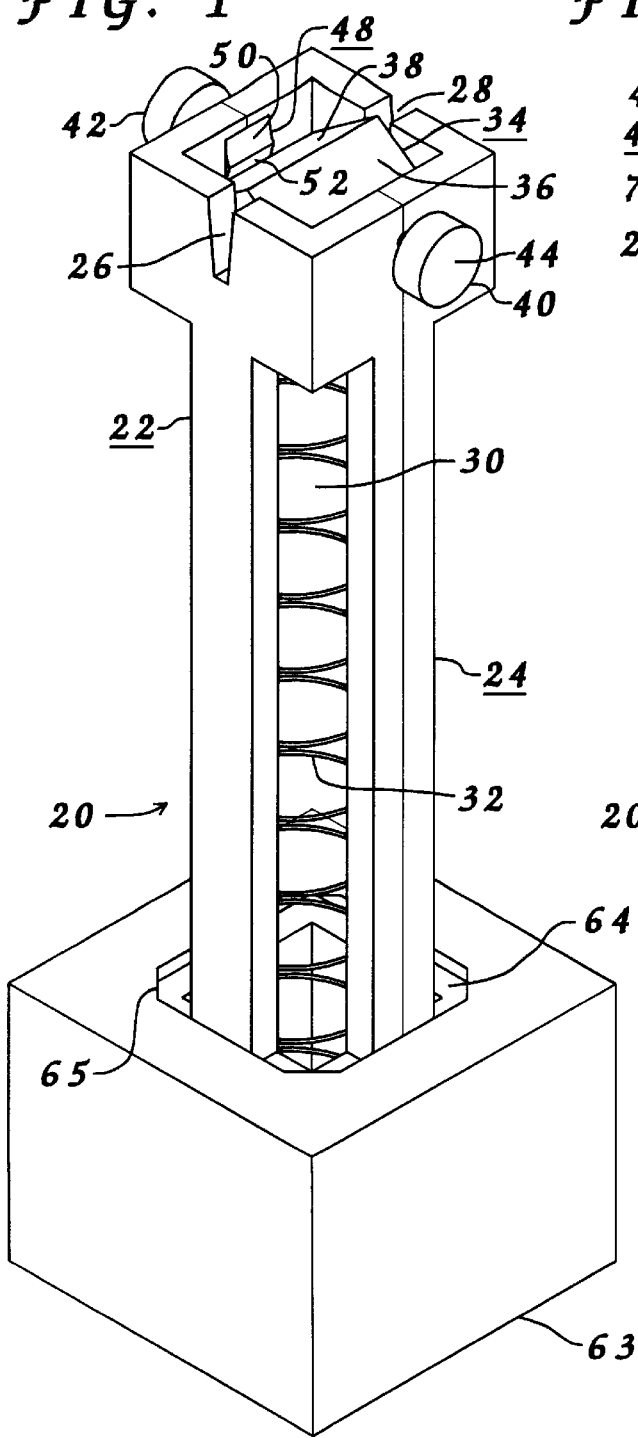
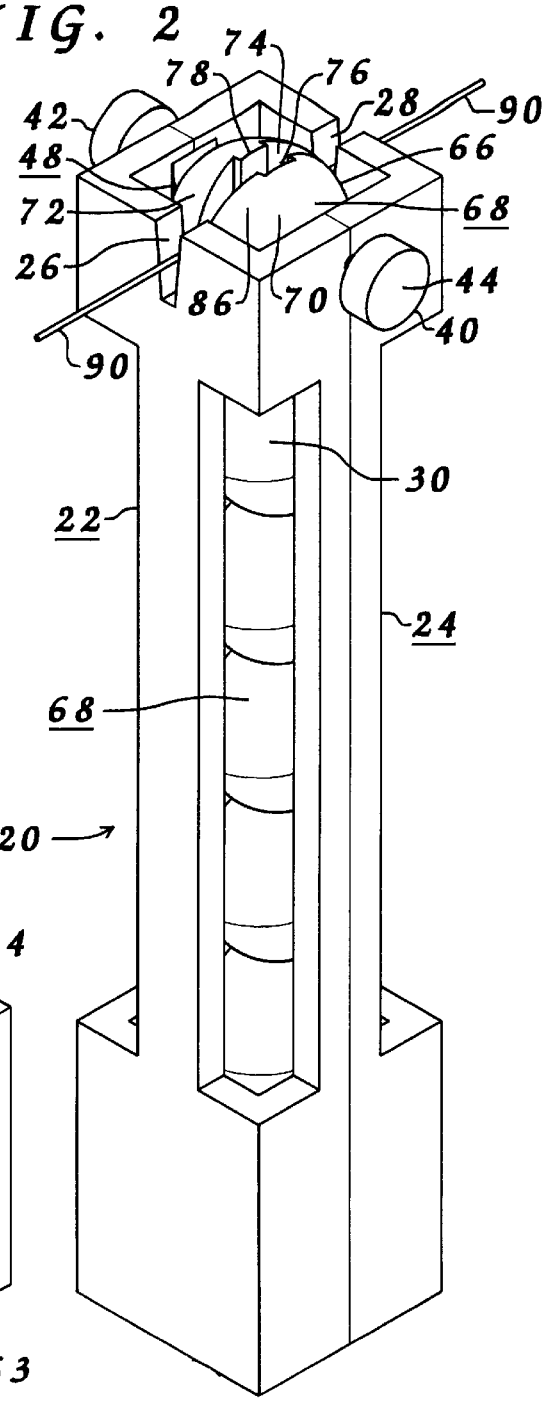

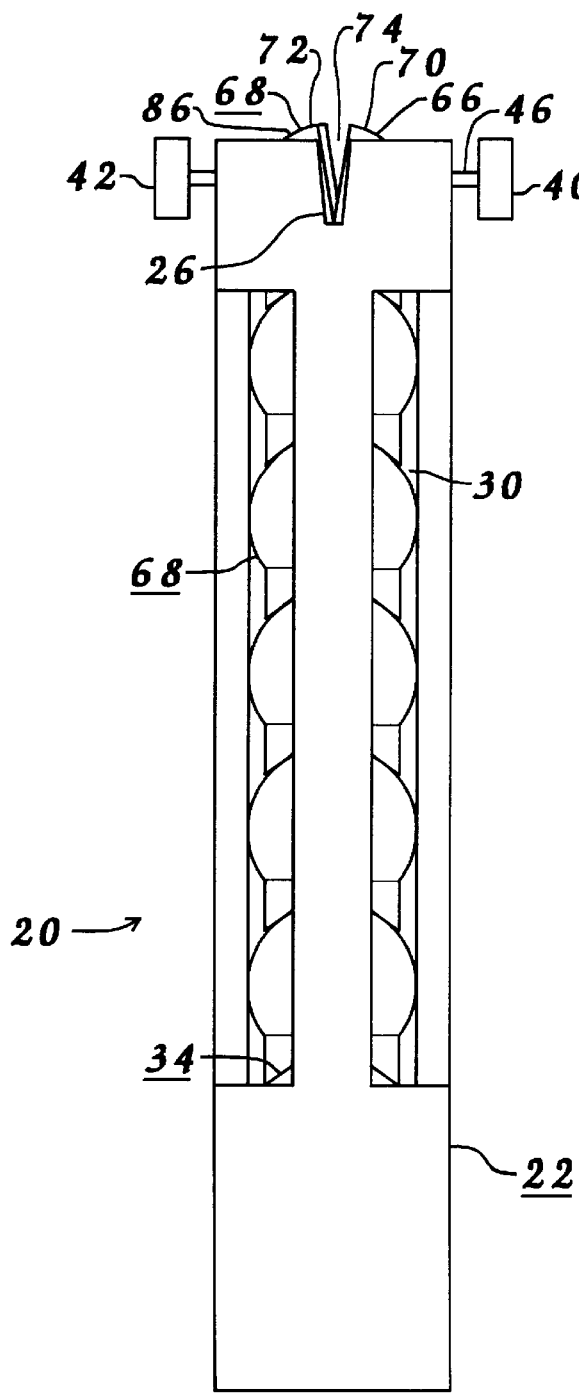
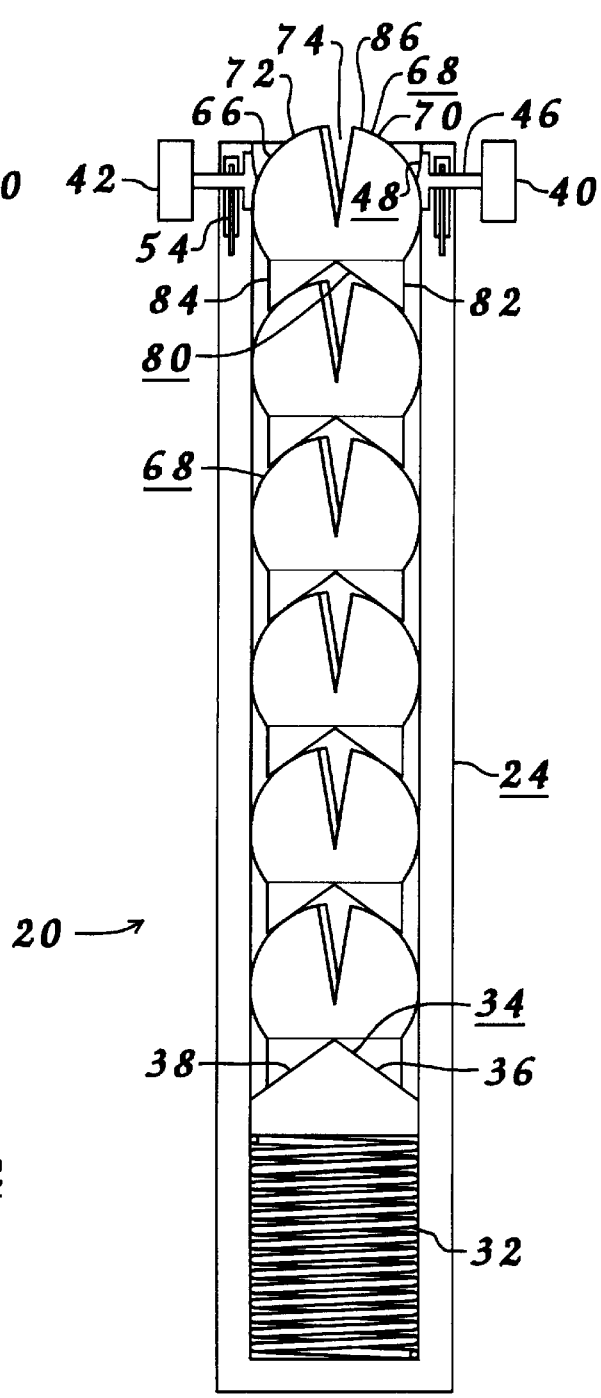

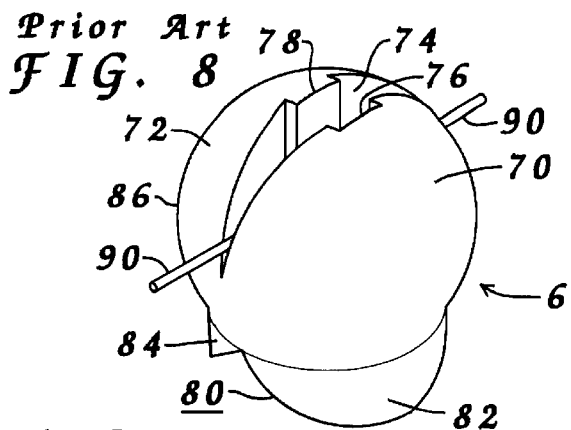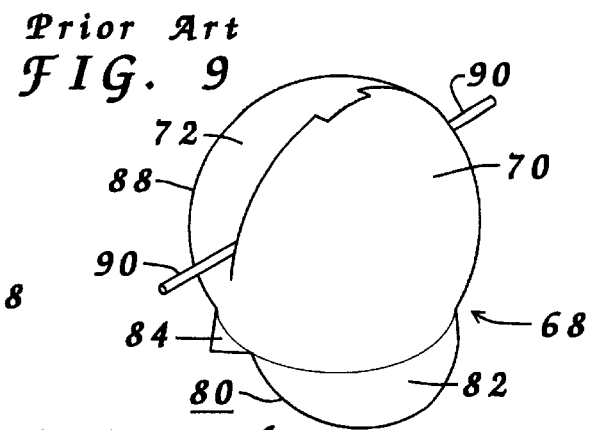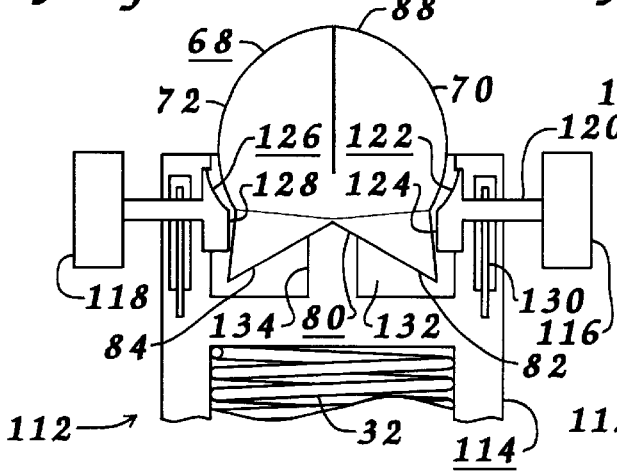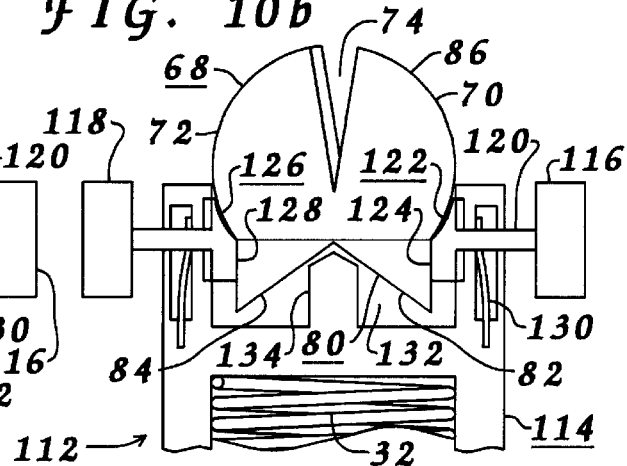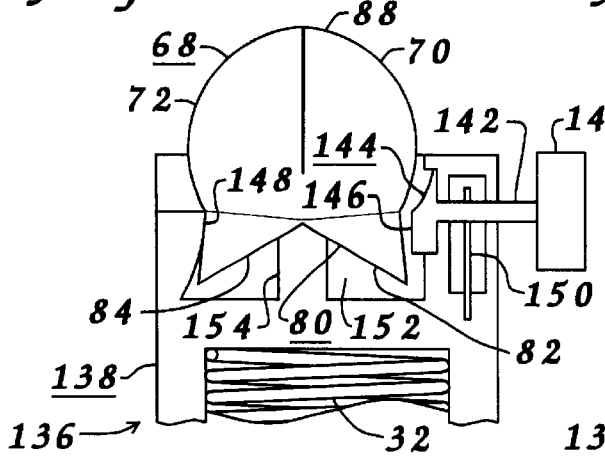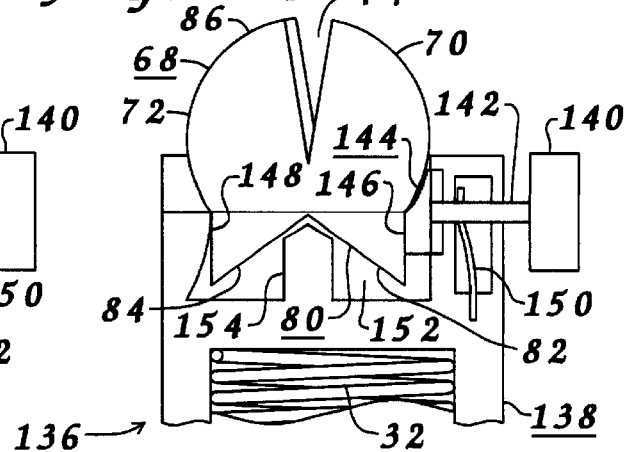

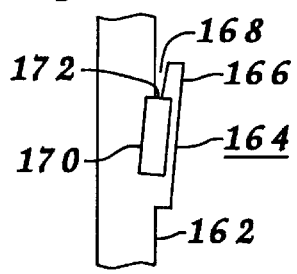
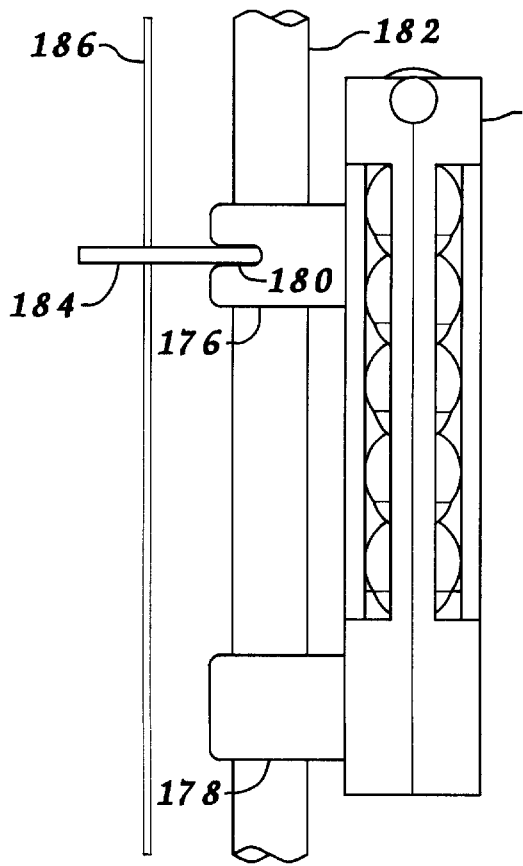
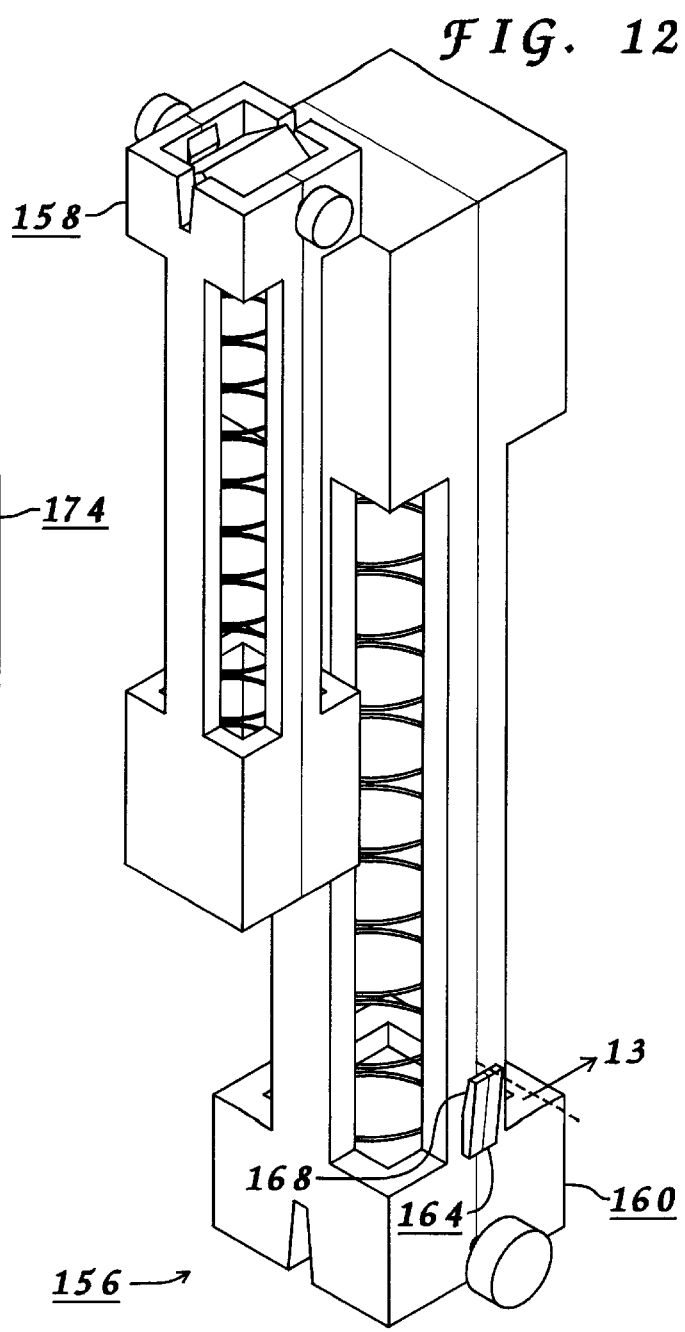

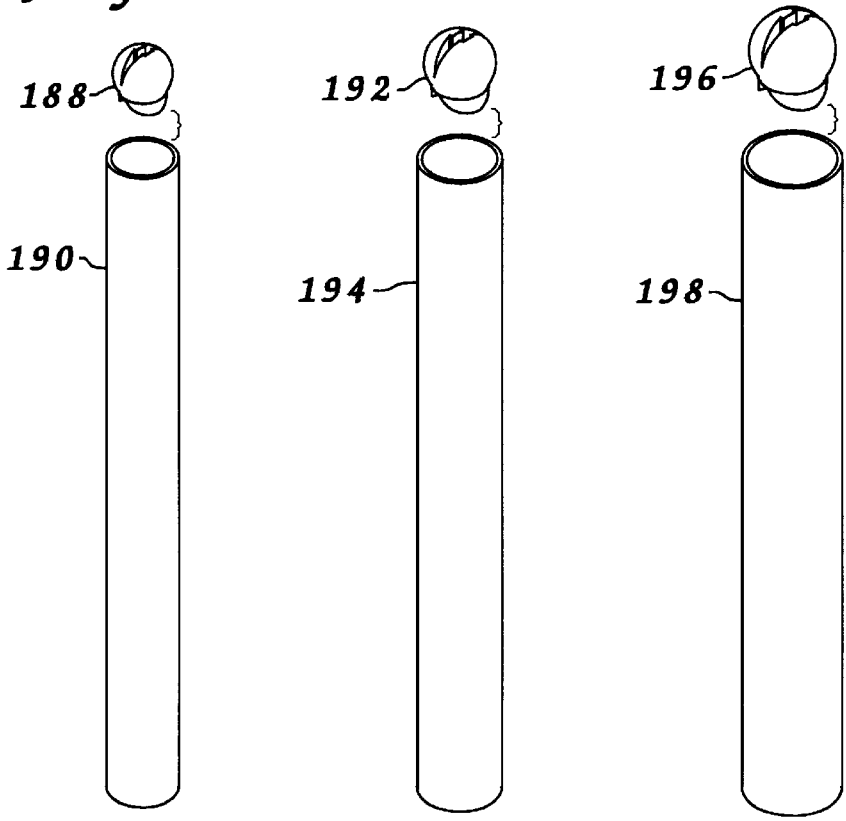

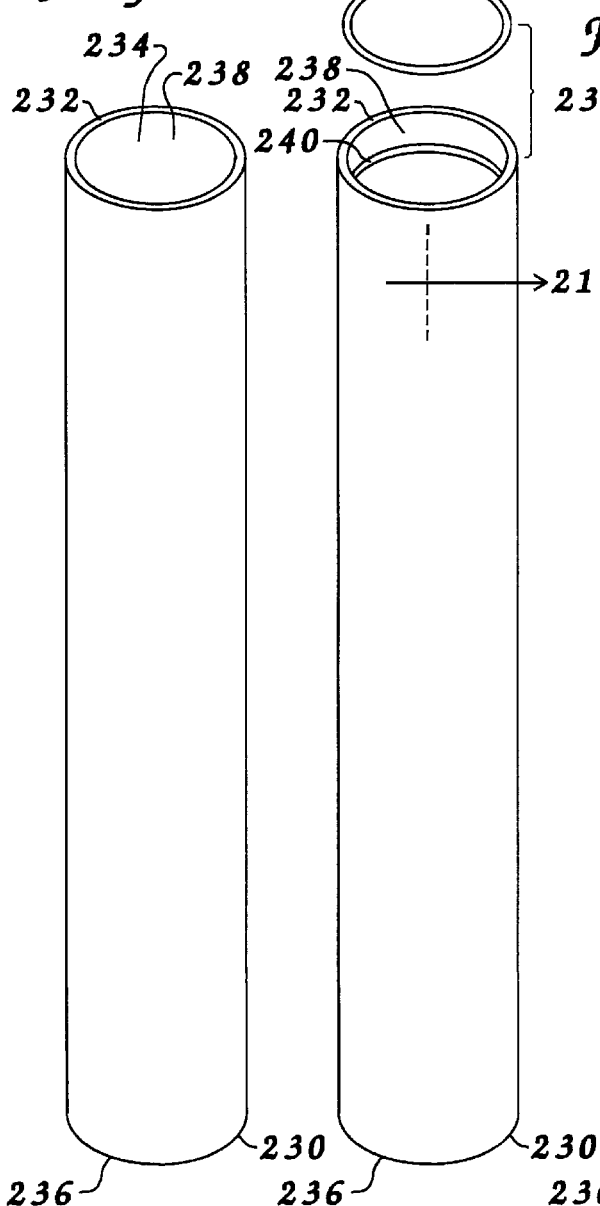

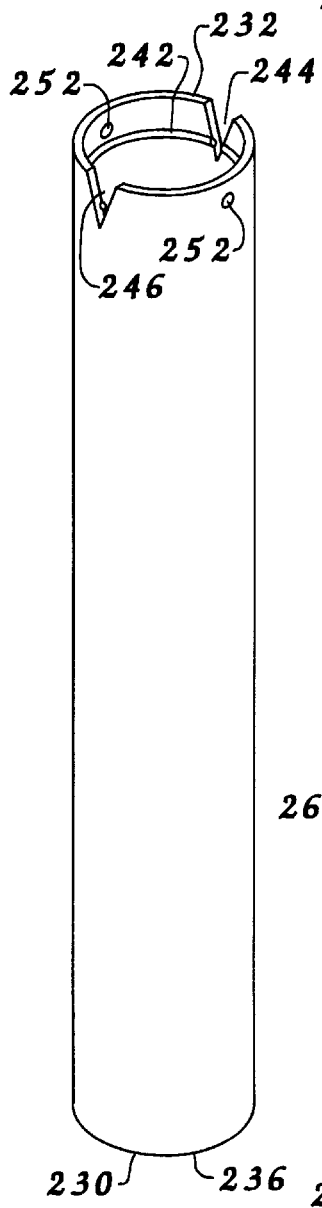
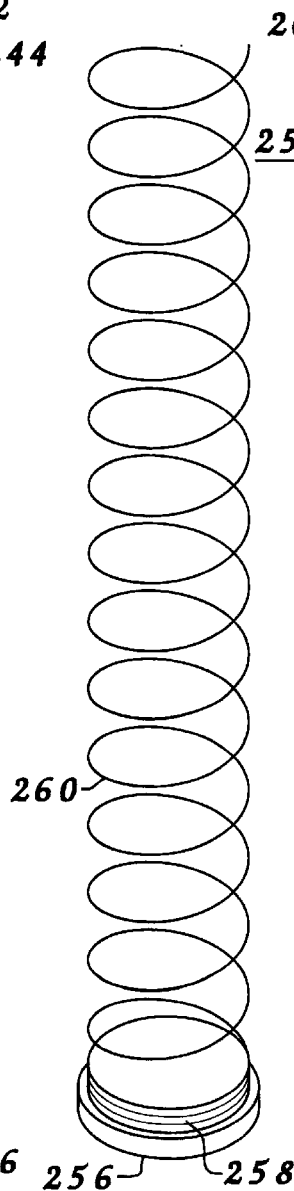
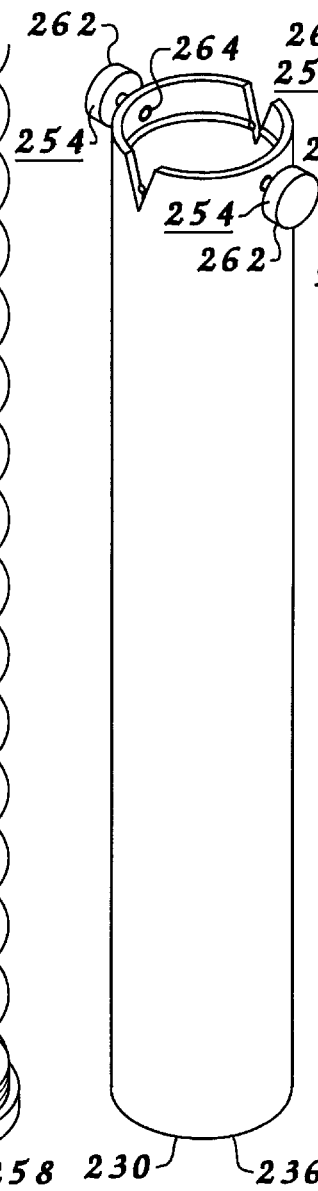
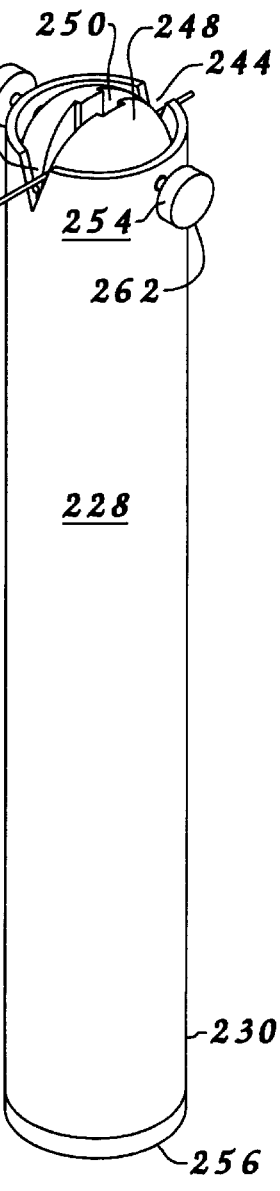

DEVICE TO HOLD, DISPENSE AND INSTALL SLOTTED WEIGHTS USED WITH FISHING LINE

CROSS-REFERENCE

This application is a continuation-in-part application of U.S. Ser. No. 08/565,878, filed Dec. 1, 1995, also entitled "Device to hold, dispense and install slotted weights used with fishing line", now abandoned.

BACKGROUND

1. Field of the Invention

Generally the invention relates to attaching slotted weights to a fishing line. More specifically, the invention relates to a device to hold, dispense and install split shot sinkers for attachment to a fishing line.

2. Description of the Prior Art

People employ numerous methods to catch fish. Individuals, as compared to commercial fishermen, most often rely on a line with a hook attached to one end of the line. This line often has weights attached thereon to provide the user with enhanced control over the line. When fishing with a float attached to the line, a weight on the line proximate the hook will cause the hook to maintain a preset depth within the water. Casting is where a reel releases line during projection of the line and hook. The attachment of additional weight, above the weight of the hook, bait and line, facilitates proper release of the line from the reel during casting.

In the art we find numerous types of weights and attachment methods. A common type is a one piece metallic weight, having two separate opposing sides connected at a base with a slot disposed between these two sides. The application of pressure on the opposing sides across the slot results in a pivoting at the base and the closure of the slot to securely engage a line placed within the slot. It is difficult to return early versions of these weights to a reuseable state following closure of the slot.

A recent development produced slotted weights having opposing spaced extensions extending from the opposing sides of the weight distal the opening of the slot. Following closure, the application of inwardly directed pressure to these extensions cause a pivoting of the opposing sides of the weight to open the slot.

The application of slight pressure on the opposing sides of the sinker will close the slot with the line placed within the slot. Generally, the fisherman will either use pliers or bite on the weight while held between the teeth. The first method generally requires both hands to be free at least during placement of the split shot sinker within the jaws of the pliers. Following such placement, one hand holds the pliers and the other hand manipulates the line into the slot. The second method also generally requires both hands to be free, while further eliminating visual inspection of the actual closure operation.

For these reasons there remains a need for a simple device which can be operated using one hand. The device must securely hold a split shot sinker with the slot in a desired alignment for placement of the line within the slot. Further, the device needs to provide for a mechanical closure of the slot using the same single hand operation and immediate release of the now attached split shot sinker from the device. Additionally, the device needs to provide for repetitive installation of a plurality of split shot sinkers without requiring user manipulation other than positioning and the application of pressure to close the slot. The present invention substantially fulfills these needs.

SUMMARY

In view of the foregoing disadvantages inherent in the conventional method of handling and attaching split shot sinkers to a fishing line, your applicant has devised a device to store, dispense and install split shot sinkers on a fishing line. The device provides for the ordered containment of a plurality of split shot sinkers. One of the split shot sinkers assumes a position from which installation onto a fishing line may occur. This split shot sinker is the target sinker. The slot of the target sinker remains in an open state prior to installation. Positioning of the slot of the target sinker must be such that insertion of the line therein may occur. Following such insertion, a clamping member, operated by the user, applies pressure to the target sinker to cause the slot to close. A firm attachment of the target sinker to the line results from this closing action. Release of the target sinker from the device results from the closure of the slot. Following release of the target sinker from the device, one of the remaining split shot sinkers assumes the position of, and designation as, the target sinker. While the device holds at least one of the split shot sinkers, a target sinker constantly remains ready for installation onto the line.

A removal tool transfers a split shot sinker from the closed state to the open state. This transfer occurs without regard of the presence of the line within the slot. The application of pressure to opposing extension members situated distal the opening of the slot cause a pivoting of the opposing sides of the sinker and result in the opening of the slot.

Our invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The primary object of the present invention is to provide for a simple mechanical device to simplify handling of slotted line weights used by sports fishermen.

Other objects include;

a) to provide for a device constructed utilizing identical opposing shell components.

b) to provide for a device constructed utilizing a tubular housing member.

c) to provide for a device to hold a plurality of split shot sinkers.

d) to provide for guiding a fishing line for insertion into the slot of a target sinker.

e) to provide for advancement of a split shot sinker to a position of attachment following attachment and release of the target sinker.

f) to provide for installation of addition split shot sinkers into the device when the fully loaded supply becomes depleted.

g) to provide for retention of the split shot sinkers within the device while the split shot sinkers are in a spread state.

h) to provide for retention of the split shot sinkers within the device while each adjacent pair of split shot sinkers have a physical contact therebetween.

i) to provide for controlled closure of the slot to secure the target sinker to the line.

j) to provide for release of the target sinker from the device following closure of the slot.

k) to provide for a removal tool to open the slot when in the closed state.

l) to provide for a single engagement member to allow insertion and retention of the split shot sinkers into the device.

m) to provide for an alignment member to allow aligned insertion of the split shot sinkers within the device.

n) to provide for a view area to allow the user to determine the number of split shot sinkers remaining in the device.

o) to provide for a device to hold, dispense and install different sized split shot sinkers.

p) to provide for mounting of the sinker handling device on a fishing rod for convenient use by fishermen without requiring release of the fishing rod during usage of the sinker handling device.

q) to provide for sufficient buoyancy to allow the unit to float when full of sinkers to prevent loss.

r) to provide for insert tubes to allow a unit to handle different sized sinkers.

s) to provide for positionable and securable movable side members to allow the unit to handle different sized sinkers.

t) to provide for other tools to be incorporated into the design of the unit to allow the user to easily handle such tools during the fishing procedure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 1 is a perspective view of a dispenser unit.

FIG. 2 is a perspective view of the dispenser unit shown in FIG. 1 with the floatation device removed and split shot sinkers installed therein.

FIG. 3 is an elevational view of the dispenser unit shown in FIG. 2.

FIG. 4 is an elevational view of the dispenser unit shown in FIG. 3 with a first housing member removed to expose the interior thereof.

FIG. 8 is a perspective view of a prior art split shot sinker shown in an open position.

FIG. 9 is a perspective view of the prior art split shot sinker shown in FIG. 8 depicted in a closed position.

FIG. 10a and FIG. 10b are elevational views of a removal tool depicted in alternative positions.

FIG. 11a and FIG. 11b are elevational views of a second embodiment of a removal tool depicted in alternative positions.

FIG. 12 is a perspective view of a multiple handling unit.

FIG. 13 is a sectional view of a line cutter as taken from the section line '13' shown in FIG. 12.

FIG. 14 is a sectional elevational view of an embodiment of the invention attached to a fishing rod.

FIG. 15 is a perspective view of an insert tube and a sinker.

FIG. 16 is a perspective view of an insert tube and a sinker.

FIG. 17 is a perspective view of an insert tube and a sinker.

FIG. 18a is an elevational view of a multi-sized sinker handling unit.

FIG. 18b is an elevational view of the multi-sized sinker handling unit shown in FIG. 18a in an alternative position.

FIG. 19 is a perspective view of a tubular member.

FIG. 20 is a perspective view of the tubular member shown in FIG. 19 following a modification thereto and the addition of a resilient ring member.

FIG. 21 is a sectional view as taken from the section line '21' shown in FIG. 20.

FIG. 22 is a perspective view of the tubular member shown in FIG. 20 following installation of the resilient ring member.

FIG. 23 is a sectional view as taken from the section line '23' shown in FIG. 22.

FIG. 24 is a perspective view of the tubular member shown in FIG. 22 following a modification thereto.

FIG. 25 is a perspective view of a base member and a spring.

FIG. 26 is a perspective view of the tubular member shown in FIG. 24 following installation of addition components.

FIG. 27 is a perspective view of a complete sinker handling unit.

DESCRIPTION

Figure 6A:
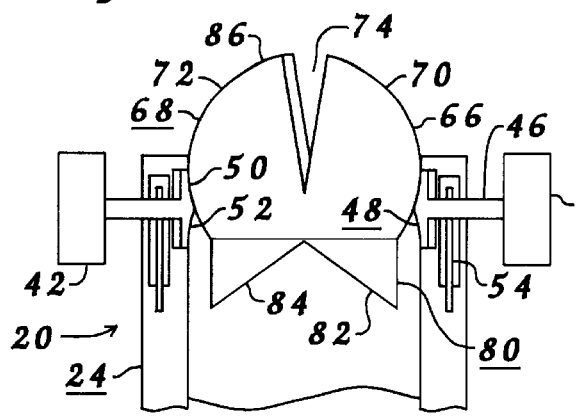
FIG. 6a through FIG. 6e are elevational views of the upper extent of the second housing member shown in FIG. 4 depicting various positional relationships during operation of the dispenser unit.

Referring now to the drawings where like reference numerals refer to like parts throughout the various views. Presented first is a description of prior art split shot sinker 68. This description will provide for a ready understanding of the specific embodiments of the invention which follow.

PRIOR ART SINKER

The instant invention is adaptable for usage with non-reuseable sinkers. Such sinkers lack the features rendering their slots easily openable from the closed state. Reuseable sinkers have features which render their slots easily openable from the closed state. The reuseable type sinker provides for easy alignment of the sinkers with a proper positioning of the slot.

FIG. 2, FIG. 3, FIG. 4, FIG. 6a through FIG. 6e, FIG. 7a through FIG. 7e, FIG. 8, FIG. 9, FIG. 10a, FIG. 10b, FIG. 11a and FIG. 11b illustrate split shot sinker 68. Particular attention is directed to FIG. 8 and FIG. 9 which illustrate split shot sinker 68 in the two operative positions. These operative positions are an open state 86, shown in FIG. 8, and a closed state 88, shown in FIG. 9. While split shot sinker 68 is of a one piece construction as formed in a mold, it has several readily identifiable sections. These sections are a first side 70, a second side 72, a first extension member 82 and a second extension member 84. A slot 74 partially separates first side 70 and second side 72 while allowing insertion therein of a fishing line 90.

Sufficient material, with sufficient cross section depth, exists between first side 70 and first extension member 82 to prevent easy bending therebetween. Similarly, sufficient material, with sufficient cross section depth, exists between second side 72 and second extension member 84 to prevent easy bending therebetween. The material, and the cross section depth of this material, connecting these two sets of components is such that bending at this position is possible with the application of relatively minor pressure.

The application of a pinching pressure on first side 70 and second side 72 across slot 74 results in a closing of slot 74. The application of a pinching pressure on first extension member 82 and second extension member 84 results in an opening of slot 74.

As an enhancement to gripping of fishing line 90, slot 74 has situated therein a securing member 78, which is an elongated raised area, and a securing trench 76, which is an elongated depression. Securing member 78 enters securing trench 76 when slot 74 is in closed state 88.

Thus, attachment to and removal from fishing line 90 is possible with this particular version of split shot sinker 68. A series of attachments and removals are possible because split shot sinker 68 retains structural integrity during the repetitive closing and opening of slot 74.

OVERVIEW

There are several requirements for a device having features of the instant invention. Below is a list of these requirements. Examples of specific embodiments fulfilling these requirements then follow.

Retention of a sinker in a dispensing position must occur for subsequent attachment to a fishing line. Proper alignment of the sinker in the dispensing position must occur to allow access to the slot to permit insertion of the fishing line therein. A closing member must be able to operate on the sinker held in the dispensing position to close the slot. The sinker held in the dispensing position must be releasable following closure of the slot. Movement of another sinker to the dispensing position for subsequent attachment to a fishing line must occur following release of a sinker from the unit. The unit must be capable of having sinkers loaded therein.

While separate structural elements may satisfy each of these requirements, a particularly expedient structural combination is to allow one set of structural elements to fulfill several of these requirements. Thus, as detailed below, one set of elements fulfills five, (5), of the above requirements. These five, (5), requirements are installation of sinkers within the unit, retention of the sinkers in the unit, proper positioning of a sinker in the dispensing position, application of a closing pressure on the sinker held in the dispensing position and release of the sinker in the dispensing position following closure of the slot.

DISPENSER UNIT'S CONSTRUCTION

The unit must be capable of holding a plurality of sinkers for controlled release. While the unit may be secured to another item, such as a fishing rod, it should be small enough to be easily hand held. Dispenser units, having features of the present invention, may have many different shapes. Cylindrical, block and oval shapes are several of the many shapes possible. It is possible to have the dispenser unit contoured to fit the human hand to enhance both handling properties and aesthetic appeal. Similarly, it is possible to have a gripable device having contours for the fingers and a trigger member complete with a trigger guard. The dispensing end, having the target sinker exposed thereon, may extend outward in front of and above the trigger.

There exists two general methods of constructing devices having the desired features of the instant invention. The first method involves assembly from at least two shell components which may each be manufactured by a molding process. The second method involves construction from commercially available tubular stock. The term tubular is intended to define a hollow conduit and it is not intended to convey an limitation as to the shape of the interior or exterior of the conduit. Therefore, the tubular member may have curved surfaces, such as round or oval, or may have planar surfaces, such as square, rectangular or triangular.

1) Component construction

Devices fulfilling the above requirements may be constructed from components formed by a molding process. While it is not a requirement, preferably the components used to construct the device will be identical to reduce manufacturing expense.

FIG. 1 through FIG. 6e illustrate a dispenser unit 20 satisfying these requirements. FIG. 4, FIG. 5 and FIG. 6a through FIG. 6e depict dispenser unit 20 with a first housing member 22 removed to show the interior components and their cooperation. It is a requirement that a secure attachment of first housing member 22 to a second housing member 24, as shown in FIG. 1 through FIG. 3, exist during usage.

Dispenser unit 20 comprises first housing member 22 and second housing member 24 each formable by a molding process. Using any of the methods known in the art, as exampled by gluing, a secure connection exists between first housing member 22 and second housing member 24 following assembly.

Figure 5:
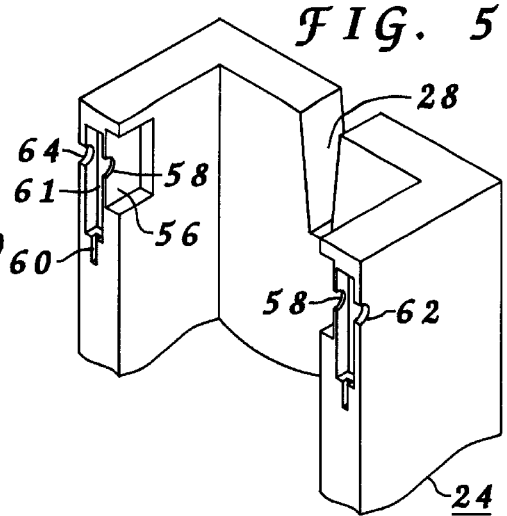
FIG. 5 is a sectional perspective view of the upper extent of a second housing member shown in FIG. 4 with various components removed.

At least second housing member 24 has features, shown in FIG. 5, which allow installation of various elements more particularly detailed below. An engagement member housing well 56 receives an engagement member 48. A spring anchor well 60 receives a resilient wire spring 54. A spring housing well 61 allows movement of resilient wire spring 54 therein. An inner aperture 58 and an outer aperture 62 cooperate to slidably restrict a connection shaft 46 therein.

As particularly shown in FIG. 6a through FIG. 6e, respective connection shafts 46 connect respective engagement members 48 to a first plunger 40 and a second plunger 42. Resilient wire spring 54 has opposing ends with one end secured within spring anchor well 60, shown in FIG. 5, with the other end penetrating connection shaft 46. Resilient wire spring 54 holds connection shaft 46 in a disposed position while allowing pressure control movement of connection shaft 46 inward or outward relative to second housing member 24.

Each plunger 40 and 42 has a contact surface 44 which allows the user to apply pressure to cause the respective plungers 40 or 42 to move inward. This movement causes the respective connection shafts 46 to move inward causing the respective engagement members 48 to move inward. When the user releases this applied pressure, the above defined assemblies return to their disposed position, as more particularly described below.

Due to the conditions surrounding usage of the device, being outdoors, around water and while handling bait and fish which make the hands slippery, accidental dropping of the unit is likely. Because of the weight of the sinkers within the unit, the unit would not be buoyant and would sink if dropped into the water. To prevent such loss of the unit, attachment of an extremely lightweight buoyant material to the unit is possible to allow floatation when full of sinkers.

A floatation member 63 comprises an extremely buoyant material of sufficient size to allow a fully loaded dispenser unit 20 to remain at the water's surface if accidentally dropped into the water. An opening 64 in one end of floatation member 63 allows insertion therein of one end of dispenser unit 20 while overlapping corners 65 engage surfaces of dispenser unit 20 to retain floatation member 63 thereon. As detailed below, the dispenser unit may have a removal tool in one end. In this configuration the floatation member may span the unit while allowing access to the opposing ends.

2) Tubular construction

Numerous configurations exist within the tubular construction method. FIG. 19 through FIG. 27 depict one example of such construction. It is possible to provide for insertion of additional sinkers into the unit through the dispensing end of the unit. Alternatively, as described below, it is possible to provide for a removable end on the unit distal from the dispensing end. This removable end may then be removed and additional sinkers installed within the unit.

FIG. 19 through FIG. 27 depict several steps in the construction of a sinker handling unit 228, shown in FIG. 27. A tubular member 230, may be of any suitable shape or material and may be rigid or slightly flexible. Such materials being readily commercially available. Tubular member 230 has a first end 232 having an opening 234 therein and a second end 236 also having an opening therein, not shown in these views. Tubular member 230 has an inside surface 238 which extends from first end 232 to second end 236. Tubular member 230 becomes the housing of sinker handling unit 228.

FIG. 20 depicts a machining operation which produces a groove 240 slightly inside of tubular member 230 from first end 232. Groove 240 is formed by the radial removal of material from inside surface 238. A resilient ring member 242 is also depicted in FIG. 20 for subsequent installation in groove 240. FIG. 21 depicts groove 240 and resilient ring member 242 prior to installation thereof.

FIG. 22 depicts tubular member 230 following installation of resilient ring member 242 into groove 240. Such installation may be by any method conventionally known in the art such as by the use of an adhesive. FIG. 23 depicts resilient ring member 242 properly installed within groove 240.

FIG. 24 depicts tubular member 230 following completion of several machining operations thereon. A first slot 244 and a second slot 246 have been cut into tubular member 230 on opposing sides of first end 232 to a depth sufficient to penetrate resilient ring member 242 and groove 240. First slot 244 and second slot 246 provide for access to a slot 250 of a target sinker 248 to insert fishing line 90, as shown in FIG. 27. Additionally, opposing apertures 252 having been drilled into tubular member 230 in close proximity to first end 232. Apertures 252 will accept plunger assemblies 254, shown installed in FIG. 26. Apertures 252 may be tapped with threads, may be smooth bore or may have other locking features therein, all conventionally known in the art. Additionally, second end 236 of tubular member 230 is manipulated, such as threading, not shown, to permit attachment thereto of a base member 256 as shown in FIG. 25.

FIG. 25 depicts base member 256 having attachment means, such as threads 258, which permit attachment to tubular member 230 to close second end 236. Attached to base member 256 is a spring 260 of sufficient length to allow for the application of advancement pressure to any sinkers contained within tubular member 230.

It is a requirement that slot 250 of target sinker 248 be closed on fishing line 90. It is possible to have tubular member 230 of a flexibility wherein pressure to the outer surface perpendicular to slot 250 of target sinker 248 results in causing the desired closure of slot 250. Alternatively, structural elements may be installed in tubular member 230 to allow for the desired closure.

FIG. 26 depicts installation of plunger assemblies 254 into apertures 252 which fulfill the over identified desire. Plunger assemblies 254 have features, as conventionally known in the art, which permits securement within an aperture while allowing the application of pressure on one side of the location of securement, in this case knobs 262, to be transferred to the opposing side of the location of securement, in this case push rods 264. This transfer occurs with resistance which ensures a return to the original positions as existed prior to the application of pressure, as conventionally known in the art.

FIG. 27 depicts sinker handling unit 228 following assembly and installation of sinkers therein, only target sinker 248 is shown. While slot 250 of target sinker 248 is spread, target sinker 248 has a circumference sufficient to ensure that resilient ring member 242 prevents passage of target sinker 248 thereby. Slot 250 of target sinker 248 is aligned with first slot 244 and second slot 246 of sinker handling unit 228. This alignment permits insertion therein of fishing line 90, as depicted. Plunger assemblies 254 permit transfer of opposing pressure from knobs 262 to the respective push rod 264 which come into contact with target sinker 248. This opposing pressure causes slot 250 to close on fishing line 90. Following such closure of slot 250 target sinker 248 has a reduced circumference. This reduced circumference is such that target sinker 248 may pass resilient ring member 242 and be released from sinker handling unit 228.

Following release of target sinker 248 spring 260 causes all remaining sinkers, not shown in these views, to advance toward first end 232 of tubular member 230. The outermost sinker then becomes the new target sinker which is prevented from being released from sinker handling unit 228 by resilient ring member 242 until closure of it's slot.

OPERATION

While applicable to either of the construction structures disclosed above, the following operation descriptions utilizes the construction disclosed above under component construction.

1) Alignment of the sinkers

Proper alignment of the sinker in the dispensing position must occur so that an application of pressure by the closing member may close the slot. Many methods exist to ensure proper alignment of the sinker in the dispensing position, including various mechanical means. The simplest method is to provide for proper alignment of all of the sinkers within the unit. With this method, if proper alignment of the sinker held in the dispensing position does not exist, the user may simply rotate the sinker to the proper position using the end of the finger.

Target sinker 66 must have slot 74 properly aligned with a first guide slot 26 and a second guide slot 28 for insertion of fishing line 90. This alignment ensures that opposing engagement members 48 may cooperate to close slot 74 when the user applies pressure to first plunger 40 and second plunger 42.

A retaining base 34, having a first alignment surface 36 and a second alignment surface 38, provide for proper alignment of the lowest sinker within dispenser unit 20. A matching of first alignment surface 36 and second alignment surface 38 of retaining base 34 with the bases of first extension member 82 and second extension member 84 of a pinchable base 80 of split shot sinker 68 ensure this proper alignment. Proper insertion of the sinkers into dispenser unit 20 ensures their proper alignment within dispenser unit 20. Retention of the proper alignment within dispenser unit 20 occurs due to the pressure retention of the plurality of sinkers, detailed below.

2) Cooperation for loading, closing slot and releasing

FIG. 6a through FIG. 6e and illustrates the cooperation of opposing engagement members 48 during insertion, retention, closure and release of one split shot sinker 68.

The loading of sinkers into the unit, following removal of an end member, is possible as depicted for the tubular construction design described above. In this configuration there is no requirement for yielding retaining members.

Figure 6B:
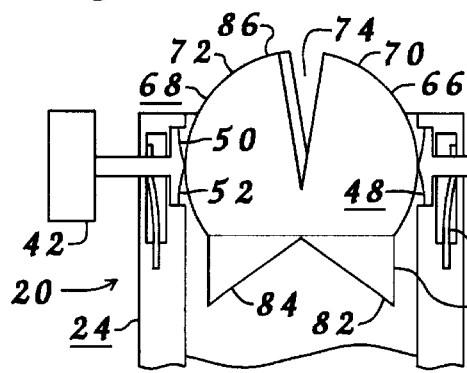
Figure 6D:
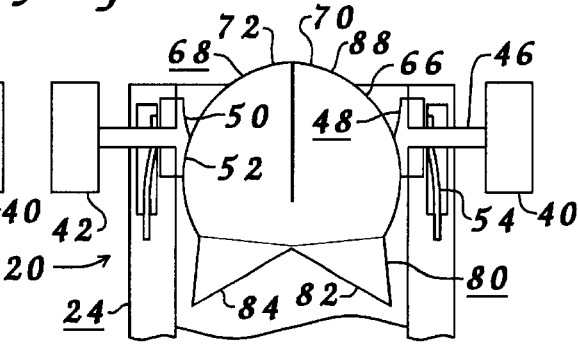
Figure 6C:
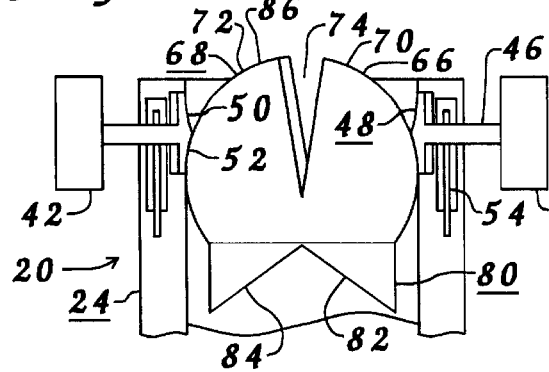
Figure 6E:
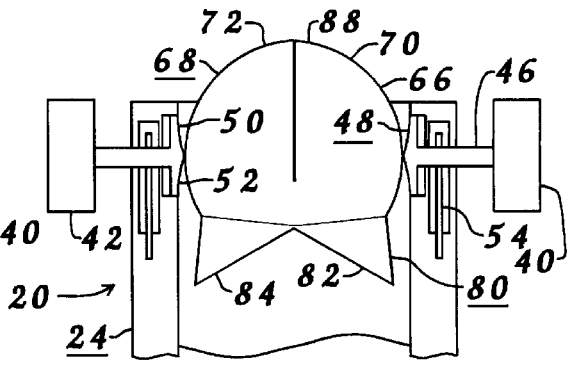

FIG. 6a shows split shot sinker 68 properly aligned with first plunger 40 and second plunger 42 prior to insertion into dispenser unit 20. Insertion into dispenser unit 20 involves the application of downward pressure on split shot sinker 68 while split shot sinker 68 slides along an insertion guide surface 50 of each engagement member 48. Opposing engagement members 48 yield from their disposed positions, as shown in FIG. 6b, and split shot sinker 68 begins to enter dispenser unit 20. Installation of split shot sinker 68 into dispenser unit 20 occurs following continued downward pressure, as shown in FIG. 6c. At this point engagement members 48 return to their disposed position, by virtue of resilient wire springs 54. Retention of split shot sinker 68 in dispenser unit 20 occurs due to contact with opposing retention surfaces 52 of the opposing engagement members 48.

As an aid to fishermen, the unit may have a lightweight motor to supply the closing power to pinch the target sinker to close the slot. A battery would power such a motor. There are two immediately identifiable activation means to control the motor. The first is to supply a trigger that the user would engage to cause activation of the motor. The second involves sensor means that would identify when placement of a line within the slot occurred. Upon such insertion of the line within the slot, the motor would cause the slot to close and securely engage the sinker to the line.

Due to upward pressure being generated on split shot sinker 68, as detailed below, split shot sinker 68 remains in contact with opposing retention surfaces 52 of opposing engagement members 48. Insertion of a fishing line, not shown, into slot 74 occurs while in the position shown in FIG. 6c. While the fishing line remains within slot 74, the user applies pressure to first plunger 40 and second plunger 42. This causes opposing engagement members 48 to apply pressure to split shot sinker 68 to close slot 74, as shown in FIG. 6d. This pressure closure of slot 74 transfers split shot sinker 68 from open state 86, shown in FIG. 6a through FIG. 6c, to a closed state, shown in FIG. 6d and FIG. 6e. Following release of the applied pressure to first plunger 40 and second plunger 42, engagement members 48 return, by virtue of resilient wire springs 54, to their disposed positions, shown in FIG. 6e.

Following closure of slot 74, split shot sinker 68 has a smaller lateral width measurement than the lateral width measurement while in open state 86. By virtue of this smaller lateral width measurement, split shot sinker 68 may now pass between opposing engagement members 48 while in their disposed positions. Release of split shot sinker 68 from dispenser unit 20 now occurs.

Due to the extremely small size of batteries and low output light bulbs, it is possible to incorporate a small flashlight proximate the target sinker to provide slight illumination during usage during night fishing.

3) Repositioning of next sinker

Following release of a sinker from the unit another sinker mechanically moves to the dispensing position. A separate mechanical assembly may engage a sinker and transfer that sinker, in the proper alignment position, to the dispensing position. A much simpler method is to simultaneously advance a sinker, held in proper alignment, following each release from the unit of a sinker.

Due to the particular features of the reuseable sinkers, being the protruding opposing extensions located geometrically opposing the slot on the sinker, these sinkers are nestable for stacking. Use of this feature allows the retention of a plurality of the sinkers in a stack with the slots always aligned with the direction of the stack. Spiral stacks are possible, and in many instances may be preferred due to the ability to contain more sinkers per linear unit of measurement along the unit. A stack having a linear alignment is the simplest method envisioned.

As previously disclosed, retaining base 34 contacts pinchable base 80 of the lowest split shot sinker 68 loaded within dispenser unit 20. A tension spring 32 constantly applies a pressure to retaining base 34, and therefore to all split shot sinkers 68 contained within the stack. Similar to the previous disclosure, opposing engagement members 48 retain target sinker 66 within dispenser unit 20 at the opposing end of the stack. When a closure and release of target sinker 66 occurs, the stack of split shot sinkers 68 advance within dispenser unit 20. Retention of this stack within dispenser unit 20 occurs due to engagement members 48 engaging the uppermost split shot sinker 68. This uppermost split shot sinker 68 then becomes the current target sinker 66. The pressure generated by tension spring 32 forces the release of target sinker 66 once slot 74 is closed.

The user can determine the number of split shot sinkers 68 contained within dispenser unit 20 by making a visual inspection through a view area 30. View area 30 is an open section which also serves as a release area for any water which may inadvertently enter dispenser unit 20 due to usage around water.

4) Loading of sinkers

The unit must be capable of having sinkers loaded therein. Due to the inexpensive manufacture of the unit, the units may be disposable following depletion of the preinstalled supply of sinkers. In this case, installation of the supply of sinkers may occur during assembly. While this configuration is possible, it is desirable that the user be able to reinstall the dispensed sinkers, or install other similarly sized sinkers, for continued usage of the unit. As previously disclosed, insertion of split shot sinkers 68 may occurs due to cooperation of engagement members 48 which yield from the disposed position outward during insertion.

While not required, it is possible to supply sinkers in a stacked attached state for insertion into the unit. One example of this places a small amount of glue on the distal ends of first extension member 82 and second extension member 84. This glue provides for binding attachment to first side 70 and second side 72 respectively of the lower adjacent split shot sinker 68. The binding attachment provides for separation to occur during closure of slot 74 of the upper split shot sinker 68 before any deforming occurs to the lower attached split shot sinker 68.

ALTERNATIVE EMBODIMENT'S OPERATION

The preference is that opposing members cooperate for the retention of the sinkers and the closure of the slot of the target sinker. Use of a single member may perform these functions for either construction method.

FIG. 7a through FIG. 7e illustrate a dispensing unit 92 constructed using the component construction method and having features of the present invention. A plunger 96 has a contact surface 98 for application of pressure by the user. A rigid connection exists between a connection shaft 100 and plunger 96. Connection shaft 100 penetrates a housing member 94. Attached to the opposing end of connection shaft 100 is an engagement member 102 having an insertion guide surface 104 and a retention surface 106. Engagement member 102 has a disposed position, shown in FIG. 7a, FIG. 7c and FIG. 7e. Retention in this position occurs due to penetration of connection shaft 100 by one end of a resilient wire spring 110. The opposing end of resilient wire spring 110 is secured to housing member 94. Situated on housing member 94, on the opposing side from engagement member 102, is a stationary surface 108. Stationary surface 108 cooperates with engagement member 102 to provide for manipulation of split shot sinker 68.

Figure 7A:
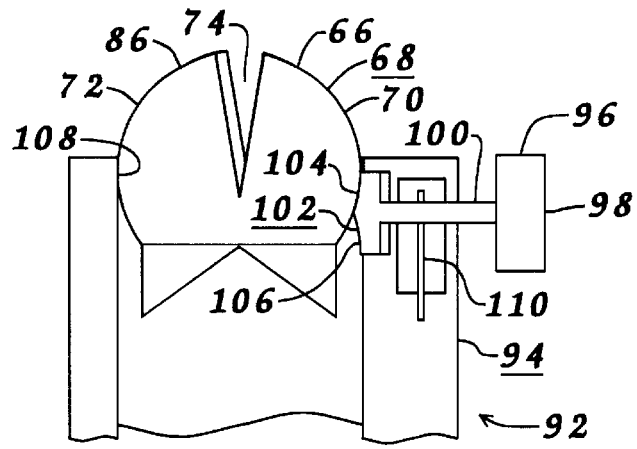
FIG. 7a through FIG. 7e are elevational views of a second embodiment of a dispensing unit depicting various positional relationships during operation.
Figure 7B:
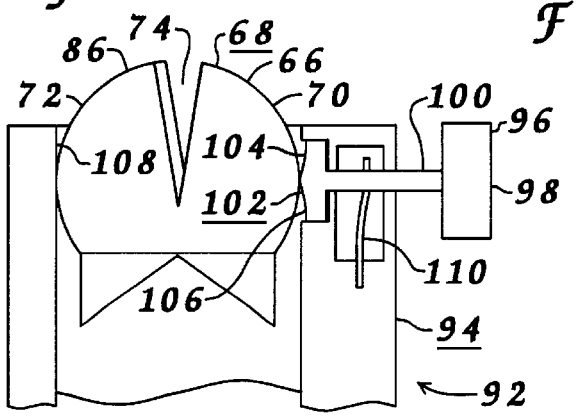

FIG. 7a depicts positioning of split shot sinker 68, while in open state 86, prior to full insertion into dispensing unit 92. First side 70 is in contact with insertion guide surface 104 of engagement member 102 while second side 72 is in contact with stationary surface 108. FIG. 7b depicts partial insertion of split shot sinker 68 into dispensing unit 92. During insertion, engagement member 102 is forced outward to allow passage of split shot sinker 68. FIG. 7c depicts full insertion of split shot sinker 68 with retention within dispensing unit 92 by retention surface 106 of engagement member 102 in cooperation with stationary surface 108. Insertion of a fishing line, not shown, into slot 74 occurs while in this position before closure of slot 74.

Figure 7D:
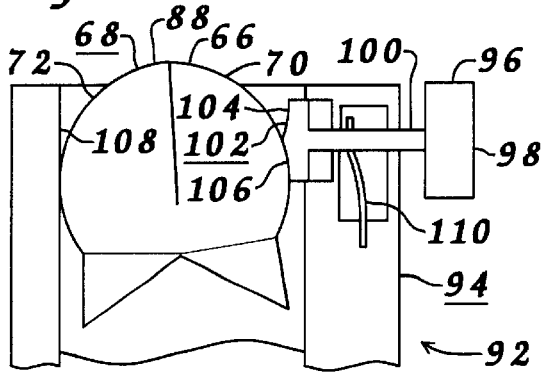
Figure 7C:
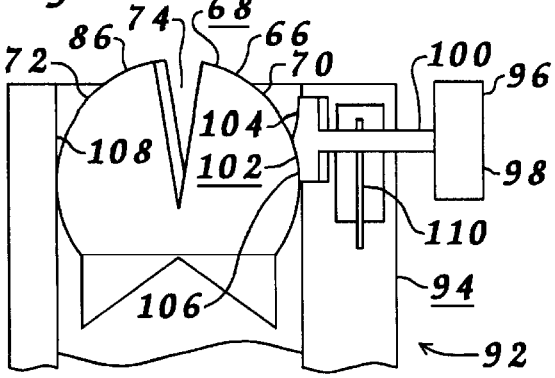
Figure 7E:
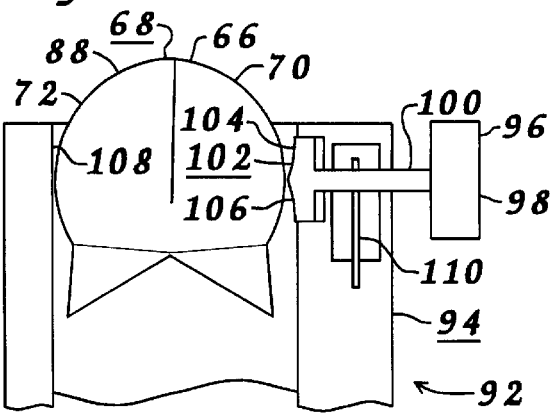

FIG. 7d depicts user applied pressure to contact surface 98 of plunger 96 to cause a pinching of target sinker 66 between engagement member 102 and stationary surface 108 to close slot 74. This closure transfers target sinker 66 from open state 86 to closed state 88. Following release of the user applied pressure, shown in FIG. 7e, engagement member 102 returns to the disposed position. Target sinker 66 is then releasable from dispensing unit 92.

REMOVAL TOOLS

As previously disclosed, dispensers having features of the present invention may utilize split shot sinkers having features rendering them openable and therefore reuseable. When using such sinkers, it is desirable to provide a tool on the dispensing unit capable of utilizing this feature.

Another use of such a tool is to properly set the relative positions of first side 70 and second side 72 to properly gauge the opening of slot 74 of split shot sinker 68. Such an operation returning any slightly deformed split shot sinkers 68 to a usable condition for handling by dispenser unit 20.

It is possible, with slight modification, to provide the insertion, retention and closing elements of the above disclosed unit with the ability to operate on the reuseable sinkers to open the slot. It is also possible to provide a separate assembly located on the unit which can operate on the reuseable sinkers to open the slot. FIG. 10a, FIG. 10b, FIG. 11a and FIG. 11b show two examples of such separate assemblies.

FIG. 10a and FIG. 10b show a removal tool 112 positioned in a housing member 114 adjacent one end of tension spring 32. Distal from the end of tension spring 32 shown would be the retention, closing and release assembly previously disclosed. The illustration of removal tool 112 has the opposing housing member removed to expose the elements contained within removal tool 112. As previously disclosed, split shot sinker 68 has pinchable base 80 having opposing extensions being first extension member 82 and second extension member 84. The relative spacing between first extension member 82 and second extension member 84 is greater while in closed state 88, shown in FIG. 10a, than when in open state 86, shown in FIG. 10b.

A housing well 132 penetrates the end of housing member 114 and contains a positioning base 134. Positioning base 134 is an elevated traversing member which matches with pinchable base 80 to hold split shot sinker 68 at a desired elevation.

A first plunger 116 connects to one end of a connection shaft 120 which penetrates housing member 114. Connection shaft 120 has attached to the opposing end a first pinching member 122 having a first pinching surface 124. First pinching member 122 has a disposed position, shown in FIG. 10a, by virtue of penetration of connection shaft 120 by one end of a resilient wire spring 130. The opposing end of resilient wire spring 130 attaches to housing member 114. The application of inwardly directed pressure to first plunger 116 moves first pinching member 122 inward relative to housing well 132.

A second plunger 118 connects to one end of a second connection shaft 120 which penetrates housing member 114. This connection shaft 120 has attached to the opposing end a second pinching member 126 having a second pinching surface 128. Second pinching member 126 has a disposed position, shown in FIG. 10a, by virtue of penetration of connection shaft 120 by one end of resilient wire spring 130. The opposing end of this resilient wire spring 130 attaches to housing member 114. The application of inwardly directed pressure to second plunger 118 moves second pinching member 126 inward relative to housing well 132.

Insertion of split shot sinker 68, in closed state 88, into housing well 132 occurs until properly seated on positioning base 134. Following such insertion, the user applies inwardly opposing pressure to first plunger 116 and second plunger 118. First pinching surface 124 and second pinching surface 128 come into contact with first extension member 82 and second extension member 84 respectively and apply a deforming pressure to pinchable base 80. This deforming pressure results in first side 70 and second side 72 being forced apart to open slot 74, as shown in FIG. 10b. Split shot sinker 68 returns to open state 86, shown in FIG. 10b. Upon release of the applied pressure, first pinching member 122 and second pinching member 126 return to their respective disposed positions, shown in FIG. 10a.

FIG. 11a and FIG. 11b show a removal tool 136 positioned in a housing member 138 adjacent one end of tension spring 32. Distal from the end of tension spring 32 shown would be the retention, closing and release assembly previously disclosed. The illustration of removal tool 136 has the opposing housing member removed to expose the elements contained within removal tool 136.

A housing well 152 penetrates the end of housing member 138 and contains a positioning base 154. Positioning base 154 is an elevated traversing member which matches with pinchable base 80 to hold split shot sinker 68 at a desired elevation.

A plunger 140 connects to one end of a connection shaft 142 which penetrates housing member 138. Connection shaft 142 has attached to the opposing end a pinching member 144 having a pinching surface 146. Pinching member 144 has a disposed position, shown in FIG. 11a, by virtue of penetration of connection shaft 142 by one end of a resilient wire spring 150. The opposing end of resilient wire spring 150 attaches to housing member 138. The application of inwardly directed pressure to plunger 140 moves pinching member 144 inward relative to housing well 152. Situated on housing member 138 on the opposing side of housing well 152 from pinching member 144 is a stationary surface 148.

Insertion of split shot sinker 68, in closed state 88, into housing well 152 occurs until properly seated on positioning base 154. Following such insertion, the user applies inwardly directed pressure to plunger 140. Pinching surface 146 comes into contact with first extension member 82 while second extension member 84 contacts stationary surface 148. This action applies a deforming pressure to pinchable base 80. This deforming pressure results in first side 70 and second side 72 being forced apart to open slot 74, as shown in FIG. 11b. Split shot sinker 68 returns to open state 86, shown in FIG. 11b. Upon release of the applied pressure, pinching member 144 return to the disposed position, shown in FIG. 11a.

Units constructed using the tubular construction method may have removal tools installed thereon. While sinker handling unit 228, shown in FIG. 27, does not have a removal tool, one may easily be incorporated into the design, as exampled by attachment to base member 256.

MULTIPLE HANDLING UNITS

It may be a desire to have a unit capable of holding, installing and dispensing sinkers having different weight measurements. Numerous configurations exist for such units. One possibility is to provide a unit having two opposing sides, each formable within a mold, similar to the construction disclosed above. A simpler approach is to simply securely affix two dispensing units, each capable of manipulation of distinct sized sinkers, together.

FIG. 12 shows a multiple handling unit 156 having, securely joined together, a first dispensing unit 158 and a second dispensing unit 160. Both first dispensing unit 158 and second dispensing unit 160 are capable of holding, installing and dispensing sinkers. First dispensing unit 158 can so handle sinkers having a lesser weight, by virtue of a small diametric measurement, than the sinkers handled by second dispensing unit 160.

ATTACHMENT TO OTHER EQUIPMENT

Due to the relatively small size of the dispenser units, it may be desirable to attach the individual unit to another item to prevent misplacement or loss. The simplest approach is to provide a string attached to the unit and for the user to wear the unit hanging either around the neck or from the belt.

Fishermen constantly handle certain equipment during the act of fishing. It is possible to attach the dispensing unit to one of these items. A fishing pole is one item that is nearly always used during line fishing. A second commonly used item is a landing net which often is worn hanging from the fishermen's belt. Attachment of the dispensing unit to one of these commonly used pieces of fishing equipment ensures ready access when required.

FIG. 13 shows the attachment of a dispensing unit 174 to a fishing pole 182. Extending from dispensing unit 174 is a first snap member 176 and a second snap member 178 which cooperate to securely attach dispensing unit 174 to fishing pole 182. It is desirable to prevent axial rotation of dispensing unit 174 around fishing pole 182, if entanglement of fishing line 186 is possible. Generally, fishing pole 182 will have at least one line eyelet 184 through which passes fishing line 186. Positioning of first snap member 176 may be such that opposing notches 180 engage line eyelet 184 to prevent rotation on fishing pole 182. Similar connection may occur to numerous other pieces of ordinary fishing equipment to provide for ready access.

Similarly it is possible to provide a clip attachment, as associated with pens, on the unit as a holding enhancement when the unit is placed within a shirt pocket.

OTHER ATTACHMENTS

It is possible to provide the unit with attachments to perform other functions. Examples of such attachments include a line cutter, a holder for loose sinkers and a hook holder.

Containment of a razor sharp piece of metal within a surrounding guard forms the line cutter. The guard prevents contact of the blade by objects of greater diametric width than ordinary fishing line to prevent injury by people, including children. Cooperating opposing extensions on the opposing housing members, adjacent the seam line, form the guard. Insertion of the blade within the guard occurs during assembly of the unit. The line cutter provides for the ability to change, quickly and efficiently, assemblies during fishing.

FIG. 12 and FIG. 13 show a line cutter 164 having a slot 168. An opening between an extension 166 and housing member 162 forms slot 168. Slot 168 has sufficient size to allow insertion therein of a fishing line, not shown, yet small enough to prevent insertion therein of a human finger. Line cutter 164 retains therein a cutting blade 170, having a cutting edge 172. Insertion of any item into slot 168 brings that item into contact with cutting edge 172.

The use of a separate containment area for loose sinkers allows the user to temporarily store sinkers following removal from the line without requiring immediate insertion into the dispensing unit. Similarly, storage of additional sinkers allows the user to reload the unit following depletion of the supply without requiring interaction with other storage devices, such as a tackle box.

A hook holder provides the user with the freedom to safely store several hooks during a fishing session. Fishermen often change hooks during a fishing session dependent upon their interpretation of the fishing conditions. A common hook change is in the selection of the size of the hook. One such hook holder allows pressure insertion of a portion of the hook between two yielding contact surfaces.

Incorporation of other structures into the design of the unit will fulfill other useful functions popular with fishermen. It is possible to incorporate other non fishing related equipment into the design of the unit. A cigarette lighter is one example of a device that a fisherman uses, yet is not directly related to fishing.

MULTISIZED SINKER HANDLING

A unit may operate to hold, dispense and install a single size of sinkers, while allowing the user to select the size of sinkers handled by the unit. Numerous methods exist to allow such a unit to operate with sinkers of varying sizes.

One method involves the use of inserts which slide into the unit and have an inner channel with a diametric measurement slightly greater than the diametric measurement of the select sinkers. These inserts allow delivery of the sinkers to a central position between the engagement members where the engagement members operate to retain; close and release the target sinker from the unit.

A second method has the two sets of opposing sides selectively movable to allow a single unit to operate with sinkers of differing diametric measurements, and therefore differing weight measurements. One such configuration allows synchronized displacement of all four sides inward and outward with secure locking at any position along this range of travel. This would allow installation of any set of identically sized sinkers selected from a range of sizes of sinkers.

FIG. 15 shows a small insert tube 190 capable of receiving small sinkers 188. FIG. 16 shows a medium insert tube 194 capable of receiving medium sinkers 192. FIG. 17 shows a large insert tube 198 capable of receiving large sinkers 196. Each insert tube 190, 194 and 198 is capable of receiving a stack of sinkers while retaining those sinkers in an aligned contact position. Insert tubes 190, 194 and 198 may either be transparent or have view slots incorporated therein along the longitudinal length to allow user inspection to determine the number of sinkers contained therein.

FIG. 18a and FIG. 18b show a multi-sized sinker handling unit 200 having a second housing 202. Removal of a first housing, as shown, exposes the components contained within multi-sized sinker handling unit 200. In use, first housing attaches to second housing 202. Multi-sized sinker handling unit 200 receives any insert tube within a range of diametric measurements, as exampled by insert tubes 190, 194 or 198. FIG. 18a shows insertion of large insert tube 198 while FIG. 18b shows insertion of small insert tube 190.

Multi-sized sinker handling unit 200 may have a spring, not shown, capable of penetration into the select installed insert tube to provide for applying pressure to the stack of sinkers installed within the insert tube. Alternatively, each insert tube 190, 194 and 198 may have a separate spring, not shown, permanently installed therein to provide for applying the pressure to the stack of sinkers installed therein.

A first pivotal anchor 204 secures a first pivotal support member 206 within multi-sized sinker handling unit 200. First pivotal support member 206 houses an assembly, having features previously disclosed, which comprises a first plunger 208 and a first engagement member 210.

A second pivotal anchor 212 secures a second pivotal support member 214 within multi-sized sinker handling unit 200. Second pivotal support member 214 houses an assembly, having features previously disclosed, which comprises a second plunger 216 and a second engagement member 218.

The application of inwardly directed pressure on first pivotal support member 206 and second pivotal support member 214 ensures that contact with the installed insert tube, 198 in FIG. 18a and 190 in FIG. 18b, occurs. This contact places first engagement member 210 and second engagement member 218 at a proper spacing, one to the other, to cooperate to act upon the specific sized sinkers, not shown, installed within the select insert tube.

A set of tension springs 220 engage a spring anchor 222 on second housing 202. The opposing ends of the pair of tension springs 220 engage first pivotal support member 206 and second pivotal support member 214 respectively. To provide for proper clearance of the largest insert tube applicable, containment of spring anchor 222 and tension springs 220 may occur within a recess in the wall of second housing 202. Opposing advance stop member 224 engage first pivotal support member 206 and second pivotal support member 214 respectively. This ensures ease of installation of the select insert tube by retaining a spacing between first pivotal support member 206 and second pivotal support member 214.

The use of opposing pivotal support members 206 and 214 ensure central delivery of the sinkers contained within the select insert tube. A slot 226, which in use would cooperate with a similar slot within the removed housing member, allow insertion of a fishing line, not shown, for purposes previously disclosed.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling with the scope of the invention.

We claim;:

1. In combination, a unit including a holder, dispenser and installer for reuseable weights, the reuseable weights for attachment to a fishing line, each of the reuseable weights having a slot, the slot having a spread state and a closed state, each reuseable weight of a type having features rendering the slot easily openable from the closed state, the unit comprising:

a) advancement means to provide for an advancement of all the reuseable weights in the unit, any adjacent pair of the reuseable weights having a physical contact therebetween during and following the advancement, the advancement means placing an outermost reuseable weight as a target sinker, the target sinker being the next reuseable weight to be dispensed from the unit, the slot of the target sinker in the spread state prior to being dispensed from the unit;

b) retaining means to provide for holding the target sinker in a dispensing position within the unit for placement of the fishing line within the slot of the target sinker;

c) clamping means to provide for a controlled pressure to be applied to the target sinker to close the slot from the spread state to the closed state wherein the target sinker is releasable from the unit following closure of the slot from the spread state to the closed state and any remaining reuseable weights advance by means of the advancement means;

d) a removal member to provide for removal of one of the reuseable weights secured to the fishing line, the removal performed by crimping of a pair of removal members situated on the reuseable weight distal from the slot, the crimping resulting in an opening of the slot to release the fishing line, the removal member comprising:
1) opposing engagement surfaces situated in spaced relationship having a clearance sufficient to provide for insertion of the pair of removal members of the reuseable weight;
2) a pinching member to provide for user controlled movement of at least one of the opposing engagement surfaces relative to the other to lessen the clearance while the pair of removal members of the reuseable weight are held between the opposing engagement surfaces;

whereby the unit holds a plurality of reuseable weights and the advancement means places one of the reuseable weights as the target sinker in the dispensing position where the line may be placed within the slot of the target sinker where the controlled pressure closes the slot and attaches the target sinker to the line and where the target sinker is then released from the unit and any remaining reuseable weights advance by means of the advancement means.

2. The unit defined in claim 1 wherein the unit further comprises two opposing shell components, each of the opposing shell components identical in composition and dimension.

3. The unit defined in claim 1 wherein the unit further comprises a tubular housing member.

4. The unit defined in claim 3 wherein the retaining means further comprises a flexible radially disposed member secured in a first end of the tubular housing member.

5. The unit defined in claim 1 wherein the clamping means comprises a movable member and a stationary member, the movable member to provide for a user applied pressure to be directed to the target sinker to cause a closing of the slot, the stationary member aligned with the movable member and cooperating with the movable member to cause the user applied pressure to be transferred to the target sinker, the target sinker in contact with the movable member and the stationary member during closure of the slot.

6. The unit defined in claim 1 wherein the clamping means comprises opposing movable members, each of the opposing movable members contacting the target sinker during closure of the slot of the target sinker, the opposing movable members cooperating to provide for a user applied pressure to be directed to the target sinker to cause a closing of the slot.

7. The unit defined in claim 1 further comprising attachment means to provide for a securing of the unit to a piece of fishing equipment; whereby the unit is accessible during usage of the piece of fishing equipment.

8. In combination, a sinker handling unit including a holder, dispenser and installer for a plurality of split shot sinkers, each of the split shot sinkers having a slot, the slot having a spread state and a closed state, the sinker handling unit comprising:
a) advancement means to provide for placing one of the split shot sinkers as a target sinker, the target sinker being the next sinker to be dispensed from the sinker handling unit;
b) retaining means to provide for holding the target sinker in the spread state for placement of a line within the slot of the target sinker;
c) clamping means to provide for a pressure to be applied to the target sinker to close the slot from the spread state to the closed state;
d) a removal member to provide for removal of an installed split shot sinker secured to the line, the removal performed by crimping of a pair of removal members situated on the split shot sinker distal from the slot, the crimping resulting in an opening of the slot to release the line;

whereby the sinker handling unit holds the plurality of split shot sinkers and the advancement means places one of the split shot sinkers as the target sinker where the line may be placed within the slot of the target sinker where pressure closes the slot and attaches the target sinker to the line and the removal member may remove the installed split shot sinker from the line.

9. The sinker handling unit defined in claim 8 wherein the sinker handling unit further comprises two opposing shell components, each of the opposing shell components identical in composition and dimension.

10. The sinker handling unit defined in claim 8 wherein the sinker handling unit further comprises a tubular housing member.

11. The sinker handling unit defined in claim 8 wherein the removal member further comprises a movable member and a stationary member, the movable member to provide for a user applied pressure to be directed to one of the split shot sinker to cause an opening of the slot, the stationary member aligned with the movable member and cooperating with the movable member to cause the user applied pressure to be transferred to the split shot sinker, the split shot sinker in contact with the movable member and the stationary member during opening of the slot.

12. The sinker handling unit defined in claim 8 wherein the removal member further comprises opposing movable members, each of the opposing movable members contacting one of the installed split shot sinker during opening of the slot of the installed split shot sinker, the opposing movable members cooperating to provide for a user applied pressure to be directed to the installed split shot sinker to cause an opening of the slot.

13. In combination, a dispensing unit including a holder, dispenser and installer for split shot sinkers, each of the split shot sinkers having a slot and alignment means, the slot having a spread state and a closed state, the alignment means to provide for an ordered contact, the ordered contact to provide for a nestable stacking of adjacent split shot sinkers while held in a contacting state wherein each set of adjacent split shot sinkers is in contact, the dispensing unit comprising:
a) a dispensing end to provide for access to a target sinker, the target sinker being the split shot sinker next to be dispensed from the dispensing unit;
b) a retaining member to provide for a prevention of a premature discharge of the target sinker from the dispensing unit, the retaining member located in close proximity to the dispensing end, the retaining member to cooperate with the target sinker while the slot of the target sinker is in the spread state to prevent discharge of the target sinker from the dispensing unit;
c) a guide channel to provide for retention of the split shot sinkers in the ordered contact, the guide channel to provide for a passage of the split shot sinkers to the dispensing end of the dispensing unit;
d) an advancement member to provide for a controlled advancement, the controlled advancement moving the split shot sinkers along the guide channel while in the contacting state toward the dispensing end of the dispensing unit following removal of the target sinker from the dispensing end, the advancement member to provide for a continuous pressure between each adjacent set of the split shot sinkers within the guide channel;

e) a clamping member to provide for a controlled pressure to be applied to the target sinker, the controlled pressure to provide for a closure of the slot of the target sinker, the target sinker being releasable by the retaining member following the closure of the slot, the clamping member positioned in close proximity to the dispensing end;

f) a removal member to provide for removal of an installed split shot sinker secured to the line, the removal performed by crimping a pair of removal members situated on the split shot sinker distal from the slot, the crimping resulting in an opening of the slot to release the line;

whereby the dispensing unit holds a plurality of split shot sinkers in the ordered contact position within the dispensing unit, the target sinker is disposed at the dispensing end ready for closure of the slot using the clamping member, following closure of the slot the target sinker is released from the dispensing unit and the remaining split shot sinkers advance along the guide channel with the split shot sinker previously adjacent the target sinker becoming the target sinker.

14. The dispensing unit defined in claim 13 wherein the dispensing unit further comprises two opposing shell components, each of the opposing shell components identical in composition and dimension.

15. The dispensing unit defined in claim 13 wherein the dispensing unit further comprises a tubular housing member.

16. The dispensing unit defined in claim 13 wherein the clamping member comprises a movable member and a stationary member, the movable member to provide for a user applied pressure to be directed to the target sinker to cause a closing of the slot, the stationary member aligned with the movable member and cooperating with the movable member to cause the user applied pressure to be transferred to the target sinker, the target sinker in contact with the movable member and the stationary member during closure of the slot.

17. The dispensing unit defined in claim 13 wherein the clamping member comprises opposing movable members, each of the opposing movable members contacting the target sinker during closure of the slot of the target sinker, the opposing movable members cooperating to provide for a user applied pressure to be directed to the target sinker to cause a closing of the slot.

18. In combination, a unit including a holder, dispenser and installer for reuseable weights, the reuseable weights for attachment to a fishing line, each of the reuseable weights having a slot, the slot having a spread state and a closed state, each reuseable weight of a type having features rendering the slot easily openable from the closed state, the unit comprising:

a) advancement means to provide for an advancement of all the reuseable weights in the unit, any adjacent pair of the reuseable weights having a physical contact therebetween during and following the advancement, the advancement means placing an outermost reuseable weight as a target sinker, the target sinker being the next reuseable weight to be dispensed from the unit, the slot of the target sinker in the spread state prior to being dispensed from the unit;

b) a tubular housing member;

c) retaining means to provide for holding the target sinker in a dispensing position within the unit for placement of the fishing line within the slot of the target sinker and wherein the retaining means further comprises a flexible radially disposed member secured in a first end of the tubular housing member and wherein the first end of the tubular housing member and the flexible radially disposed member secured therein are penetrated by opposing notches, the opposing notches to provide for access to the slot of the target sinker to permit insertion therein of the fishing line;

d) clamping means to provide for a controlled pressure to be applied to the target sinker to close the slot from the spread state to the closed state wherein the target sinker is releasable from the unit following closure of the slot from the spread state to the closed state and any remaining reuseable weights advance by means of the advancement means;

whereby the unit holds a plurality of reuseable weights and the advancement means places one of the reuseable weights as the target sinker in the dispensing position where the line may be placed within the slot of the target sinker where the controlled pressure closes the slot and attaches the target sinker to the line and where the target sinker is then released from the unit and any remaining reuseable weights advance by means of the advancement means.

* * * * *